Figure 1:
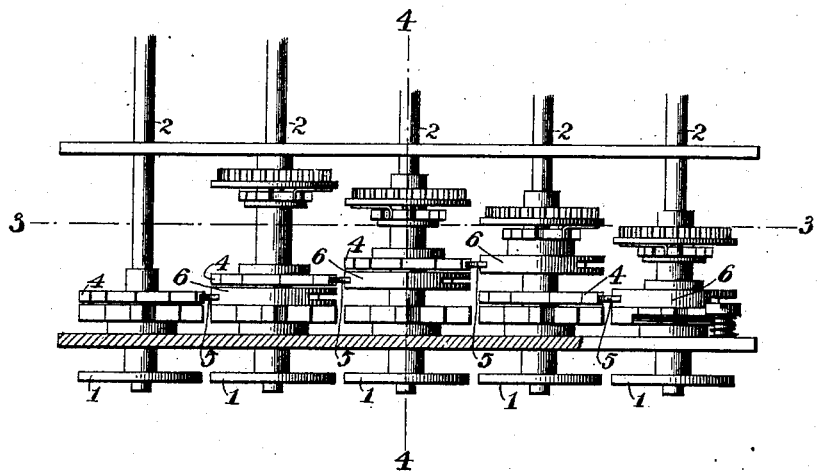

No. 718,195. PATENTED JAN. 13, 1903.
I. S. DEMENT.
REGISTER.
APPLICATION FILED OCT. 19, 1901.
NO MODEL. 2 SHEETS—SHEET 1.

Witnesses.
Wm P Hammond
G. Wm Grueber

Inventor.
Isaac S. Dement
by Sterig & Bros
Attys

No. 718,195. PATENTED JAN. 13, 1903.
I. S. DEMENT.
REGISTER.
APPLICATION FILED OCT. 19, 1901.
NO MODEL. 2 SHEETS—SHEET 2.
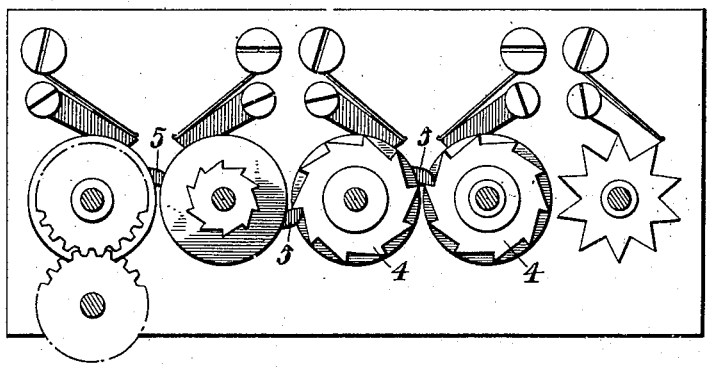
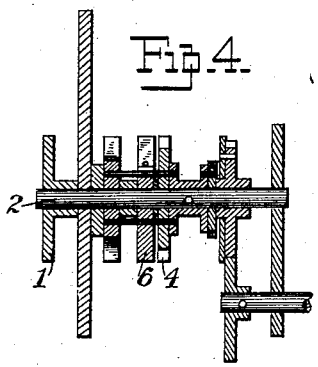
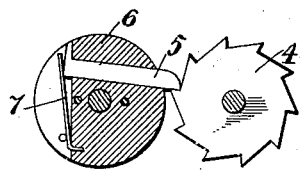
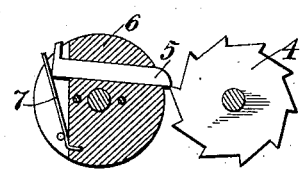
Witnesses. Inventor.
Isaac S. Dement

UNITED STATES PATENT OFFICE.

ISAAC S. DEMENT, OF EAST ORANGE, NEW JERSEY, ASSIGNOR, BY MESNE ASSIGNMENTS, TO AMERICAN MECHANICAL CASHIER COMPANY, A CORPORATION OF NEW JERSEY.

REGISTER.

SPECIFICATION forming part of Letters Patent No. 718,195, dated January 13, 1903.

Application filed October 19, 1901. Serial No. 79,274. (No model.)

*To all whom it may concern:*

Be it known that I, ISAAC S. DEMENT, a citizen of the United States, residing at East Orange, in the county of Essex and State of New Jersey, have invented certain new and useful Improvements in Registers, of which the following is a specification.

My present invention is intended to render more certain and accurate the carrying operation in registering mechanisms in which each registering-wheel is adapted to be directly operated to register a number of its own denomination and also to be operated by the register-wheel of the next lower denomination. In such mechanisms it is usual to have a pin or projection on one member adapted to engage teeth or a series of pins or projections on the next higher member of the series of registering devices, so that whenever the wheel of lower denomination revolves completely once it will by engaging one of said projections rotate the wheel of upper denomination one step. During most of the revolution of the wheel of lower denomination its carrying pin or projection is in such position as not to interfere with the independent rotation of the wheel of higher denomination; but if the wheel of lower denomination be arrested just at the point when the carrying-pin has been turned ready to engage the teeth of the wheel of upper denomination and if then said latter wheel be turned its teeth, engaging the carrying-pin, will shift the said pin and if it is rigidly attached to its wheel will carry the wheel of lower denomination back away from its correct position. It has therefore been proposed to pivot the carrying-pin, so as to allow it to yield when struck in reverse direction by the teeth of the wheel of upper denomination; but with this arrangement of the pin it has been impossible to secure the result desired on account of the length of the arc traveled through in turning upon its pivot, the result being that where the teeth of the wheel of upper denomination are at the proper distance apart the pivoted pin when pushed aside by one tooth will on its return swing interfere with the next following tooth. Where to avoid this the teeth are placed far apart, there is such loose motion that only a very limited number of wheels can be used. I have arranged the carrying-pins so that they can be readily pushed aside by the teeth of the wheel of upper denomination and yet fall in immediately behind the operating-tooth, so that there is no lost motion whatever, and I thus render the mechanism applicable to a register having any desired number of registering-wheels.

Figure 2:
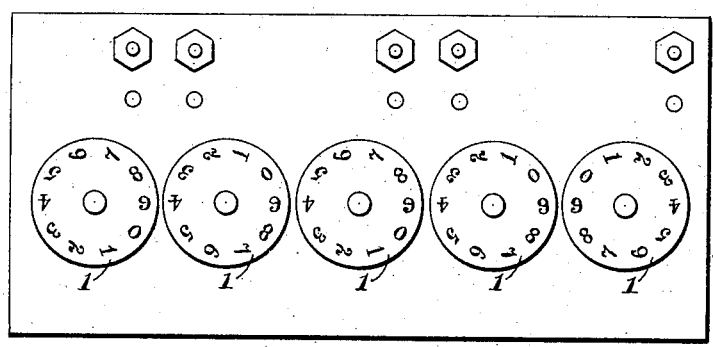

In the accompanying drawings I have shown in Figure 1 a top view of a series of registering-disks and the operating-wheels thereof. Fig. 2 is a front view of the mechanism. Fig. 3 is a sectional view on the plane indicated by the dotted line 3 3, Fig. 1. Fig. 4 is a sectional view, the plane of section being at right angles to that of Fig. 3 and being indicated by the dotted line 4 4, Fig. 1. Figs. 5 and 6 are detail views of the carrying-pin and wheel, showing two positions.

1 1 are a series of register-dials bearing numbers, as shown, which are caused to appear one at a time through an opening in the front of the case. (Not shown.) The dials in the mechanism shown are carried by a series of shafts 2, which have suitable mechanism for individually turning them. This mechanism may be of any usual or preferred construction. I have here indicated at 3 only a part thereof. The separate dials are not only intended to be individually driven, but to each drive the dial adjacent to it on the left when the dial of lower denomination has made a complete revolution. To this end on each shaft above the one to the extreme right is fixed a toothed wheel 4, and on each of the shafts, except the one to the extreme left, is mounted a pin 5, sliding in a disk or casing 6 and maintained by a spring 7 in position to engage with the teeth of the wheel 4 of the next adjacent register-shaft.

When one of the shafts—for example, the tens-shaft—is turned, its toothed wheel 4 will turn freely, pushing back the pin 5 of the units-shaft without altering the position of the latter, as shown in Fig. 6, and allowing said pin to drop back to its normal position immediately in rear of the tooth on the said toothed wheel, as shown in Fig. 5. Now when the units-wheel is turned the pin 5 is in position to receive the first impulse of motion of the toothed wheel and give the tens-shaft a single-step motion, so as to "carry" one from the lower or units shaft.

Having thus described my invention, what I claim as new therein, and desire to secure by Letters Patent, is—

In a registering mechanism, the combination of the wheel 4 having a peripheral series of ratchet-shaped teeth; an adjacent wheel 6; a tooth 5 having an oblique end and sliding out and in in an approximately radial groove in the said wheel 6 and a spring 7 tending to press the tooth constantly in projected position; the parts being constructed and arranged as herein shown and described, so that the front of the projecting end of the tooth 5 affords a radial bearing to act on the radial end of the ratchet-teeth of the wheel 4 and impart step-by-step rotation of the same, while the oblique back of the said tooth 5 causes the said tooth to automatically retire by the pressure of the back of a ratchet-tooth on the wheel 4 when the latter is turned independently, as explained.

ISAAC S. DEMENT.

Witnesses:
C. N. FAIRCHILD,
FOSTER J. HULL.